(12) United States Patent
Nozaki (10) Patent No.: US 10,727,542 B2
(45) Date of Patent: Jul. 28, 2020

(54) BATTERY DEVICE AND PROGRAM EXECUTED THEREIN

(71) Applicant: RENESAS ELECTRONICS CORPORATION, Tokyo (JP)

(72) Inventor: Hajime Nozaki, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/136,025

(22) Filed: Sep. 19, 2018

(65) Prior Publication Data

US 2019/0165428 A1 May 30, 2019

(30) Foreign Application Priority Data

Nov. 30, 2017 (JP) ................... 2017-230794

(51) Int. Cl.
*H02J 7/00* (2006.01)
*H01M 10/42* (2006.01)
*H01M 2/30* (2006.01)
*H01M 10/44* (2006.01)

(52) U.S. Cl.
CPC ........... *H01M 10/425* (2013.01); *H01M 2/30* (2013.01); *H01M 10/44* (2013.01); *H02J 7/00* (2013.01); *H02J 7/0068* (2013.01); *H01M 2010/4271* (2013.01); *H02J 2207/10* (2020.01)

(58) Field of Classification Search
CPC ........ H02J 7/0068; H02J 7/022; H02J 7/0031; H01M 10/44
See application file for complete search history.

(56) References Cited

U.S. PATENT DOCUMENTS

| | | | |
|---|---|---|---|
| 10,298,028 B1* | 5/2019 | Venkatasamy | H02J 7/0021 |
| 10,418,839 B2* | 9/2019 | Miller | H02J 7/0042 |
| 2002/0085403 A1* | 7/2002 | Cho | H01M 2/1022 |
| | | | 363/146 |
| 2003/0098670 A1* | 5/2003 | Kobayashi | H02J 7/0068 |
| | | | 320/114 |
| 2004/0108833 A1* | 6/2004 | Lanni | H02J 7/0004 |
| | | | 320/116 |
| 2004/0113587 A1* | 6/2004 | Bohne | H02J 7/0004 |
| | | | 320/128 |
| 2005/0189909 A1* | 9/2005 | Guthrie | G06F 1/263 |
| | | | 320/107 |
| 2017/0302098 A1* | 10/2017 | Miller | H02J 7/025 |

FOREIGN PATENT DOCUMENTS

JP 2016-220422 A 12/2016

* cited by examiner

*Primary Examiner* — Arun C Williams
(74) *Attorney, Agent, or Firm* — McDermott Will & Emery LLP (57) ABSTRACT

A connector of a battery device includes a first terminal and a second terminal. The first terminal is coupleable to an opposed unit through a cable in a first state. The second terminal is coupleable to the opposed unit through the cable in the second state which is inverted upside down from the first state. A control device of the battery device is configured to charge the battery device with electric power from the opposed unit, when it is coupled to the opposed unit through the cable in the first state, and to supply the opposed unit with electric power from the battery device, when it is coupled to the opposed unit through the cable in the second state.

7 Claims, 9 Drawing Sheets

BATTERY DEVICE AND PROGRAM EXECUTED THEREIN

CROSS-REFERENCE TO RELATED APPLICATIONS

The disclosure of Japanese Patent Application No. 2017-230794 filed on Nov. 30, 2017 including the specification, drawings and abstract is incorporated herein by reference in its entirety.

BACKGROUND

The present disclosure relates to a battery device, and, more particularly, to a process for switching between power supply and power receiving in the battery device.

Battery devices are known as those for charging electronic devices. The battery device generally has a receiving port and a supplying port. A battery device which receives and supplies power through one port is also known. This battery device has an external switch, and is configured to switch between a power receiving operation and a power supply operation, in accordance with switching of a switch.

Japanese Unexamined Patent Application Publication No. 2016-220422 discloses an electronic unit which performs high-speed charging, when a reversible connector is coupled to the surface, and which also performs normal charging, when it is coupled to the back surface (see ABSTRACT).

SUMMARY

In the above-described battery device, it is necessary to separately provide the receiving port and the supplying port, or it is necessary to provide a switch for switching between the power receiving operation and the power supply operation. These parts cause an increase in the cost and the size of the battery device. Users need to discriminate the port, in accordance with the power receiving operation or the power supply operation, when a cable is coupled to the battery device, or to switch the switch after the cable is coupled thereto. Thus, user-friendly battery devices are required, with a simpler structure.

The present disclosure has been made to solve the above problem, and an object thereof in a certain aspect is to provide a user-friendly battery device with a simpler structure. Any other objects and new features will be apparent from the descriptions of the present specification and the accompanying drawings.

According to an embodiment, there is provided a battery device coupleable to an opposed unit through a cable. This battery device has a connector which is coupleable to the cable, a battery, and a control device which switches between a power supply mode for supplying electric power from the battery to the opposed unit through the cable and a power receiving mode for charging the battery with electric power from the opposed unit through the cable. The connector includes a first terminal coupleable to the opposed unit through a cable in a first state, and a second terminal coupleable to the opposed unit through a cable in a second state which is inverted upside down from the first state. The control device is configured to charge the battery with electric power from the opposed unit, in a state where the power receiving mode is set, and when the first terminal and the opposed unit are coupled with each other through the cable in the first state, and supply the opposed unit with electric power from the battery, in a state where the power supply mode is set, when the second terminal and the opposed unit are coupled with each other through the cable in the second state.

A battery device according to an embodiment can realize a simpler structure than that of the related art.

The above object and any other objects, features, aspects, and advantages of the disclosed technical features will be apparent from the following detailed descriptions of the present invention to be understood by referring to the accompanying drawings.

DETAILED DESCRIPTION

Descriptions will now specifically be made to preferred embodiments based on the technical ideas, by referring to the accompanying drawings. In the descriptions below, the constituent parts are identified by the same reference symbols. Their names and functions are also the same. Thus, they are not described over and over. The preferred embodiments and modifications as will be described below may selectively and appropriately be combined.

Technical Ideas

A battery device according to this disclosure is configured to be coupleable to an opposed unit through a cable. The battery device determines whether the cable is coupled to the connector on its front surface (first state) or coupled thereto on its back surface (second state). The battery device is configured to supply electric power to the opposed unit when the cable is coupled to the connector on its front surface, and to receive electric power from the opposed unit when the cable is coupled on the back surface of the connector. The cable is configured to be distinguishable between its front surface and the back surface.

As described above, the battery device according to this disclosure can supply and receive electric power, using one single connector (port). This battery device does not need any additional switch for switching between the power supply operation and the power receiving operation. Thus, this battery device can realize a simpler structure than that of the battery device of the related art.

The user can simply couple the cable to the connector in a state where the direction of the cable corresponds to a desired operation (a power supply operation or a power receiving operation). Thus, the battery device according to this disclosure is a more user-friendly device than the battery device of the related art.

First Embodiment (Configuration of Power Supply System 100)

Figure 1:
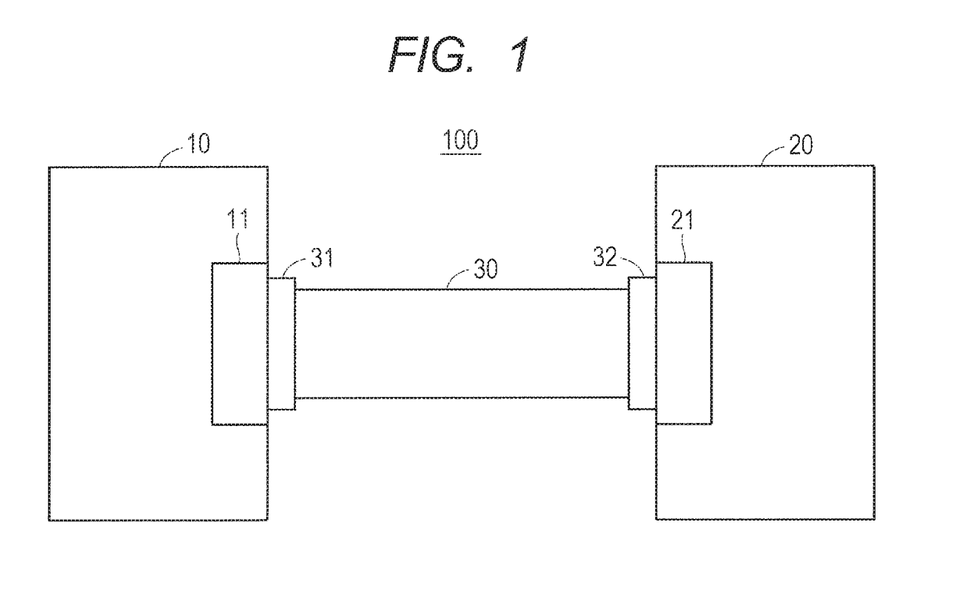
FIG. 1 is a diagram for explaining a configuration of a power supply system based on a first embodiment.

FIG. 1 is a diagram for explaining a configuration of the power supply system 100 based on the first embodiment.

The power supply system 100 has a battery device 10, a device 20, and a cable 30, by referring to FIG. 1.

The battery device 10 includes a connector 11, while the device 20 includes a connector 21.

Both ends of the cable 30 are provided respectively with plugs 31 and 32. In the example illustrated in FIG. 1, the plug 31 is inserted into the connector 11, while the plug 32 is inserted into the connector 21. As a result, the battery device 10 and the device 20 are coupled to each other through the cable 30. Note that the plugs 31 and 32 are configured to be coupleable to the connectors 11 and 21.

The battery device 10 can supply electric power to the opposed unit (for example, the device 20) through the cable 30. When the opposed unit is configured to supply electric power, the battery device 10 can receive electric power supplied from the opposed unit through the cable 30.

Hereinafter, the device which supplies electric power to the opposed unit is defined as a "source", while the device which receives electric power from the opposed unit is defined as a "sink". The battery device 10 can function as a source and a sink.

In this embodiment, the device 20 may also function as a source and a sink. In this sense, it can be said that the device 20 is also a battery device. The device 20 may be a portable electronic unit, such as a smartphone or a tablet. In another aspect, the device 20 for forming the power supply system 100 may be a device which functions only as a source or a device which functions only as a sink.

The cable 30 is based on the USB Type-C standard, as an example.

(Configuration of Cable 30)

Figure 2:
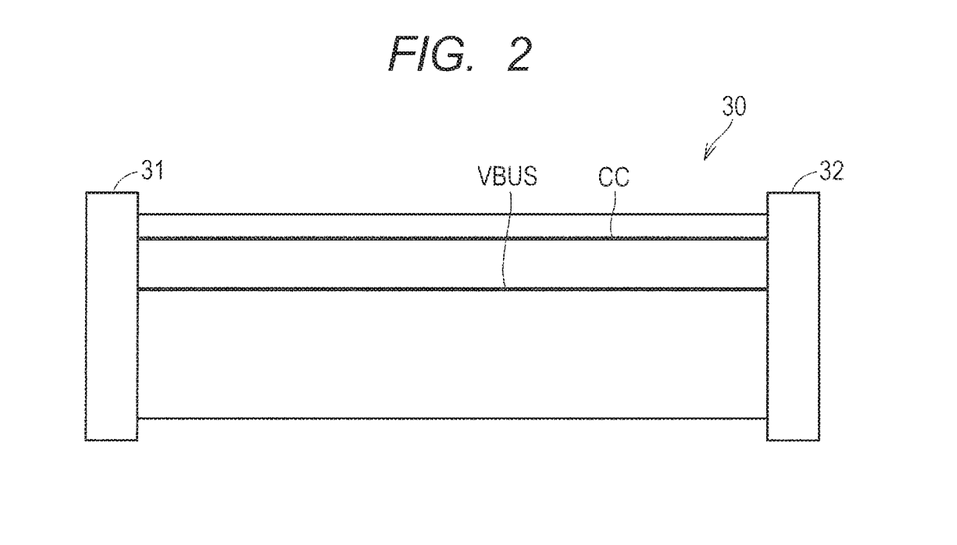
FIG. 2 is a diagram illustrating a configuration example of a cable for use in the power supply system according to the first embodiment.

FIG. 2 is a diagram illustrating a configuration example of the cable 30 for use in the power supply system 100 according to the first embodiment.

By referring to FIG. 2, the cable 30 includes a configuration channel line CC (hereinafter referred to also as a CC line) and a power source line VBUS. The CC line is used for communication between the source and the sink. The power source line VBUS is supplied with a power source voltage. This power source voltage can be selected from a plurality of power source voltages within the power source voltage standard. The cable 30 can include a data wiring and a ground wiring.

The plugs 31 and 32 of the cable 30 are plates having openings in the coupling parts with the connectors 11 and 21, and have contact points arranged to be coupled to each cable in the openings. Hereinafter, the surface on which the CC line is arranged is referred to as a "front surface", while the surface opposed to the front surface is referred to as a "back surface", of the openings of the plugs 31 and 32.

The cable 30 (plugs 31 and 32) is configured to be distinguishable between the front surface and the back surface. In one example, the plugs 31 and 32 have a particular mark (seal) or a label attached to only one of the front surface and the back surface. In another example, the plugs 31 and 32 have a particular mark or label provided differently between the front surface and the back surface. In another example, the mold (housing) of the plugs 31 and 32 is configured with the front surface side and the back surface side in an asymmetrical shape (for example, a trapezoidal form).

(Configuration of Battery Device 10)

Figure 3:
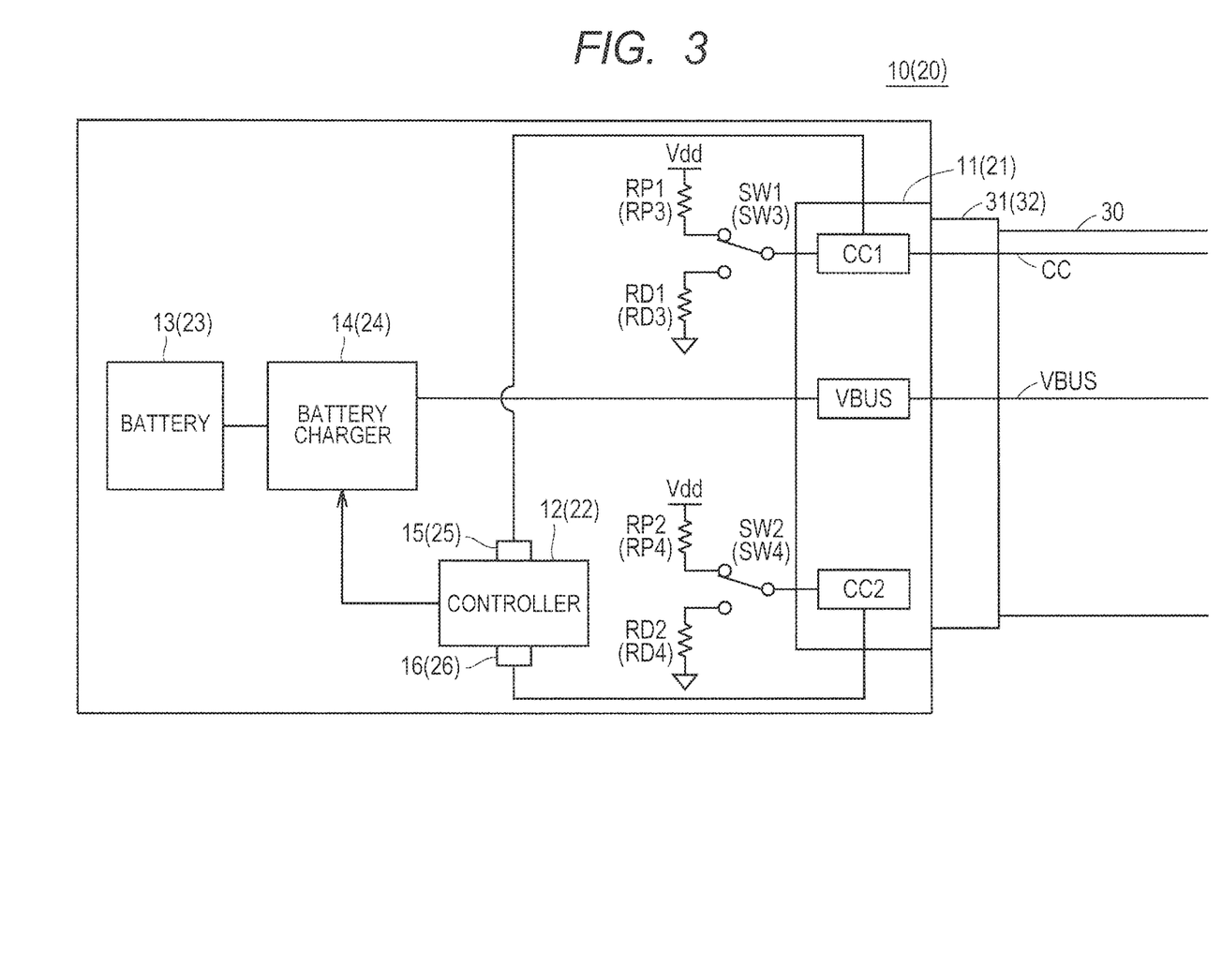
FIG. 3 is a diagram illustrating a configuration example of a battery device and a device, according to the first embodiment.

FIG. 3 illustrates a configuration example of the battery device 10 and the device 20, according to the first embodiment. The connector 11 is based on the USB Type-C standard, as one example. Specifically, the connector 11 has terminals CC1 and CC2 which are coupleable to the CC line of the cable 30. The connector 11 has a terminal VBUS which is coupleable to the power source line VBUS of the cable 30.

The terminals CC1 and CC2 are arranged in point symmetry. Then, the connector 11 is configured to be coupleable to the cable 30 (plug 31) whose front surface faces upward and also to the cable 30 whose back surfaces faces downward.

More particularly, when the connector 11 is coupled to the cable 30 with the upward front surface, one of the terminals CC1 and CC2 is coupled to the CC line. When the connector 11 is coupled to the cable 30 with the upward back surface, the other one of the terminals CC1 and CC2 is coupled to the CC line.

Hereinafter, the state in which the terminal CC1 is coupled to the CC line is defined as a state in which the front surface of the cable 30 is coupled to the connector 11, while the state in which a terminal CC2 and the CC line are coupled to each other is defined as a state in which the back surface of the cable 30 is coupled to the connector 11.

The terminal CC1 is coupled to a switch SW1. The switch SW1 switches the coupling destination of the terminal CC1 between a pull-up resistor RP1 and a pull-down resistor RD1.

The terminal CC2 is coupled to a switch SW2. The switch SW2 switches the coupling destination of the terminal CC2 between a pull-up resistor RP2 and a pull-down resistor RD2.

The pull-up resistors RP1 and RP2 are coupled to a power source potential (for example, 3.3V). The pull-down resistors RD1 and RD2 are coupled to a ground potential.

The battery device 10 further includes a controller 12, a battery 13, and a battery charger 14. The battery 13 is coupled to the battery charger 14. The battery charger 14 is coupled to the terminal VBUS.

The controller 12 includes a circuit having a calculation function and a tangible readable recording medium. The circuit having the calculation function may include at least one semiconductor integrated circuit like a processor, at least one application-specific integrated circuit ASIC (Application Specific Integrated Circuit), at least one DSP (Digital Signal Processor), at least one FPGA (Field Programmable Gate Array), and/or a circuit having any other calculation function. The recording medium may take forms of a magnetic medium (for example, a hard disk), an optical medium (for example, a compact disk (CD), DVD), a volatile memory, an arbitrary type of a non-volatile memory. However, it is not limited only to these forms. The volatile memory may include a DRAM (Dynamic Random Access Memory) and an SRAM (Static Random Access Memory). The non-volatile memory may include a RAM and an NVRAM. The controller 12 may execute various processes as will be described later, by reading one or more instructions from the recording medium.

The controller 12 controls the operations of the battery device 10. The battery 13 supplies electric power to the device 20 in some aspect through the battery charger 14, the terminal VBUS, and the power source line VBUS. The battery 13 receives an input of electric power from the device 20 in some aspect.

The battery charger 14 performs an operation in accordance with an input voltage and an output voltage. In one example, the battery charger 14 includes a step up/down circuit, steps up an input voltage when the input voltage is greater than an output voltage, and steps down the input voltage when the input voltage is lower than the output voltage. For example, the battery charger 14 is configured to step up the input voltage in the case of a power supplying operation, and to step down the input voltage in the case of a power receiving operation.

The controller 12 switches whether the battery device 10 functions as a source (power supplying mode) or as a sink (power receiving mode). The controller 12 controls the switches SW1 and SW2 to couple the terminals CC1 and CC2 to the pull-up resistors RP1 and RP2, when the battery device 10 functions as a source. The controller 12 controls the switches SW1 and SW2 to couple the terminals CC1 and CC2 to the pull-down resistors RD1 and RD2, when the battery device 10 functions as a sink.

The controller 12 has means for detecting a potential of the terminals CC1 and CC2. An example is a comparator which represents whether a potential is greater or lower than a particular threshold potential or an A/D converter. Descriptions will hereinafter be made to an example of the A/D converter. The controller 12 is coupled to A/D converters 15 and 16. The A/D converters 15 and 16 are coupled respectively to the terminals CC1 and CC2. The A/D converter 15 converts a potential of the terminal CC1 into a digital value, and outputs it to the controller 12. The A/D converter 16 converts a potential of the terminal CC2 into a digital value, and outputs it to the controller 12.

(Configuration of Device 20)

In this embodiment, the device 20 has the same configuration and functions as those of the battery device 10. More specifically, in the device 20, a controller 22, a battery 23, a battery charger 24, A/D converters 25 and 26 respectively correspond to the controller 12, the battery 13, the battery charger 14, and the A/D converters 15 and 16, in the battery device 10. The connector 21 has the same configuration as that of the connector 11. The terminal CC1 included in the connector 21 is coupled to a pull-up resistor RP3 or a pull-down resistor RD3 through a switch SW3. The terminal CC2 included in the connector 21 is coupled to a pull-up resistor RP4 or a pull-down resistor RD4 through a switch SW4.

(DRP (Dual Role Port))

The controller 12 periodically switches the coupling destination of the switches SW1 and SW2 between the pull-up resistor and the pull-down resistor, until it is judged that the battery device 10 and the device 20 are coupled with each other. In one example, the controller 12 synchronizes the switches SW1 and SW2. When the switch SW1 is coupled to the pull-up resistor RP1, it controls the switch SW2 also to be coupled to the pull-up resistor RP2. Descriptions will now be made to a judgment method for the coupling between the battery device 10 and the device 20.

(Judgment on Coupling with Opposed Unit)

The controller 12 monitors a potential of the terminals CC1 and CC2, and judges whether the battery device 10 and the device 20 are coupled with each other.

The controller 12 judges that the battery device 10 and the device 20 are not coupled with each other, when the potential of the terminals CC1 and CC2 is a power source potential (for example, 3.3V) or a ground potential (0V).

When the battery 10 is not coupled with the cable 30, the potential of the terminals CC1 and CC2 is a power source potential (for example, 3.3V) or a ground potential (0V).

Even when the battery device 10 is physically coupled with the device 20 through the cable 30, the controller 12 may judge that the battery device 10 and the device 20 are not coupled with each other.

In one example, the CC line of the cable 30 is coupled to the terminal CC1 of the connector 11 and the terminal CC1 of the connector 21. When the terminal CC1 of the connector 11 is coupled to the pull-up resistor RP1, and the terminal CC1 of the connector 21 is coupled to the pull-up resistor RP3, the potential of the terminal CC1 of the connector 11 is kept at a power source potential. When the terminal CC1 of the connector 11 is coupled to the pull-down resistor RD, and the terminal CC1 of the connector 21 is coupled to the pull-down resistor RD3, the potential of the terminal CC1 of the connector 11 is kept at a power source potential. In this case, the controller 12 judges that the battery device 10 and the device 20 are not coupled with each other, and continues to perform an operation for switching the coupling destination of the switches SW1 and SW2 between the pull-up resistor and the pull-down resistor.

When the potential of the terminals CC1 and CC2 is an intermediate potential (for example, 1.67V) between the power source potential and the ground potential, the controller 12 judges that the battery device 10 and the device 20 are coupled with each other.

(Setting of Controller 12)

The controller 12 according to this embodiment is set in a manner that the battery device 10 functions as a sink, when it is coupled to the device 20 through the front surface of the cable 30, that is, when the terminal CC1 and the device 20 are coupled with each other through the CC line. The controller 12 is set in a manner that the battery device 10 functions as a source, when it is coupled to the device 20 through the back surface of the cable 30, that is, when the terminal CC2 and the device 20 are coupled with each other through the CC line.

In another aspect, the controller 12 may be set to control the battery device 10 to function as a sink, when the CC line is coupled to the terminal CC2, and controls the battery device 10 to function as a source, when the CC line is coupled to the terminal CC1.

Hereinafter, the function (source/sink) of the battery device 10 which is set in accordance with the direction (coupling state) of the cable 30 with respect to the connector 11 is also referred to as "a role corresponding to the cable".

As described above, the controller 12 controls the terminals CC1 and CC2 to be coupled to the pull-up resistors RP1 and RP2, when the battery 10 is controlled to function as a source, and controls the terminals CC1 and CC2 to be coupled to the pull-down resistors RD1 and RD2, when the battery device 10 is controlled to function as a sink. That is, the function of the battery device 10 is determined, in accordance with the coupling state (whether they are coupled to the pull-up resistors RP1 and RP2 or the pull-down resistors RD1 and RD2) of the switches SW1 and SW2. Hereinafter, the function (source/sink) of the battery device 10 which is determined in accordance with the coupling state of the switches SW1 and SW2 is also referred to as "a role corresponding to the switch".

The controller 12 switches the coupling destination of the switches SW1 and SW2 between the pull-up resistors and the pull-down resistors, until it is judged that the battery device 10 and the device 20 are coupled with each other. Thus, the switches SW1 and SW2 may be coupled to the pull-up resistors or the pull-down resistors, when the battery device 10 and the device 20 are coupled. That is, when the battery device 10 and the device 20 are coupled, the role corresponding to the cable may not match with the role corresponding to the switch.

Descriptions will now be made to a control operation executed by the controller 12, for controlling the battery device 10 to function as a role corresponding to the cable.

(In a Case where the Role Corresponding to the Cable Matches with the Role Corresponding to the Switch)

Figure 4:
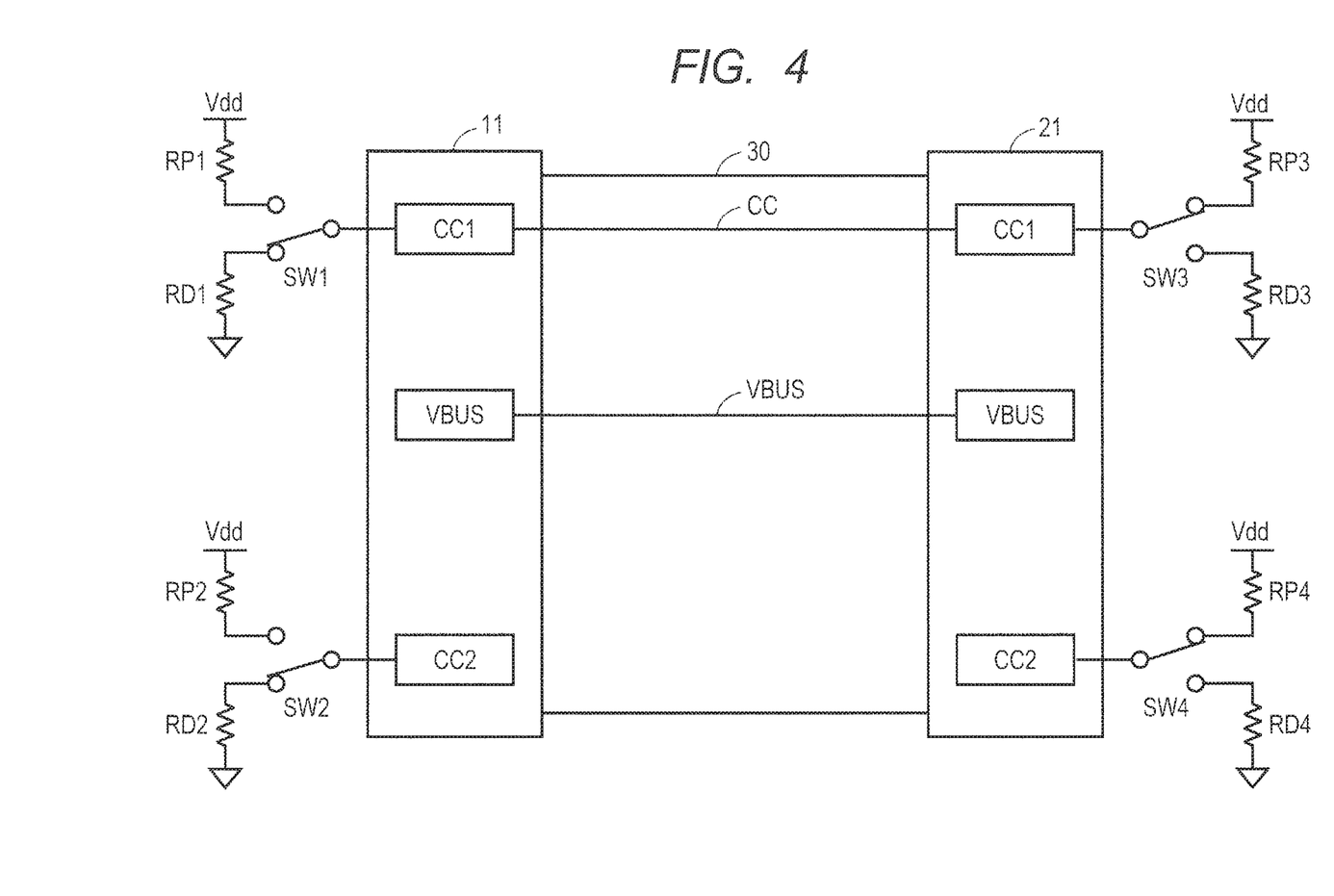
FIG. 4 is a diagram illustrating a coupling state (Part 1) of the battery device and the device through a cable.

FIG. 4 is a diagram illustrating a coupling state (Part 1) of the battery device 10 and the device 20 through the cable 30.

In the example illustrated in FIG. 4, the CC line of the cable 30 is coupled to the terminal CC1 of the connector 11 and the terminal CC1 of the connector 21. The terminal CC1 of the connector 11 is coupled to the pull-down resistor RD1, and the terminal CC1 of the connector 21 is coupled to the pull-up resistor RP3. At this time, the terminal CC1 of the connector 11 is at an intermediate potential. As a result, the controller 12 judges that the battery device 10 and the device 20 are coupled with each other.

Because the CC line of the cable 30 is coupled to the terminal CC1 of the connector 11, the role corresponding to the cable is a "sink". Because the terminal CC1 of the connector 11 is coupled to the pull-down resistor RD1, the role corresponding to the switch is a "sink". That is, at the coupling of the battery device 10 and the device 20, the role corresponding to the cable matches with the role corresponding to the switch.

In this case, the controller 12 performs a power receiving operation in accordance with the role corresponding to the cable. The controller 12 outputs a control signal to the battery charger 14. In response to this control signal, the battery charger 14 converts an input voltage input from the battery 23 of the device 20 through the power source line VBUS and the terminal VBUS, into a predetermined voltage corresponding to the battery 13, and supplies it to the battery 13.

Figure 5:
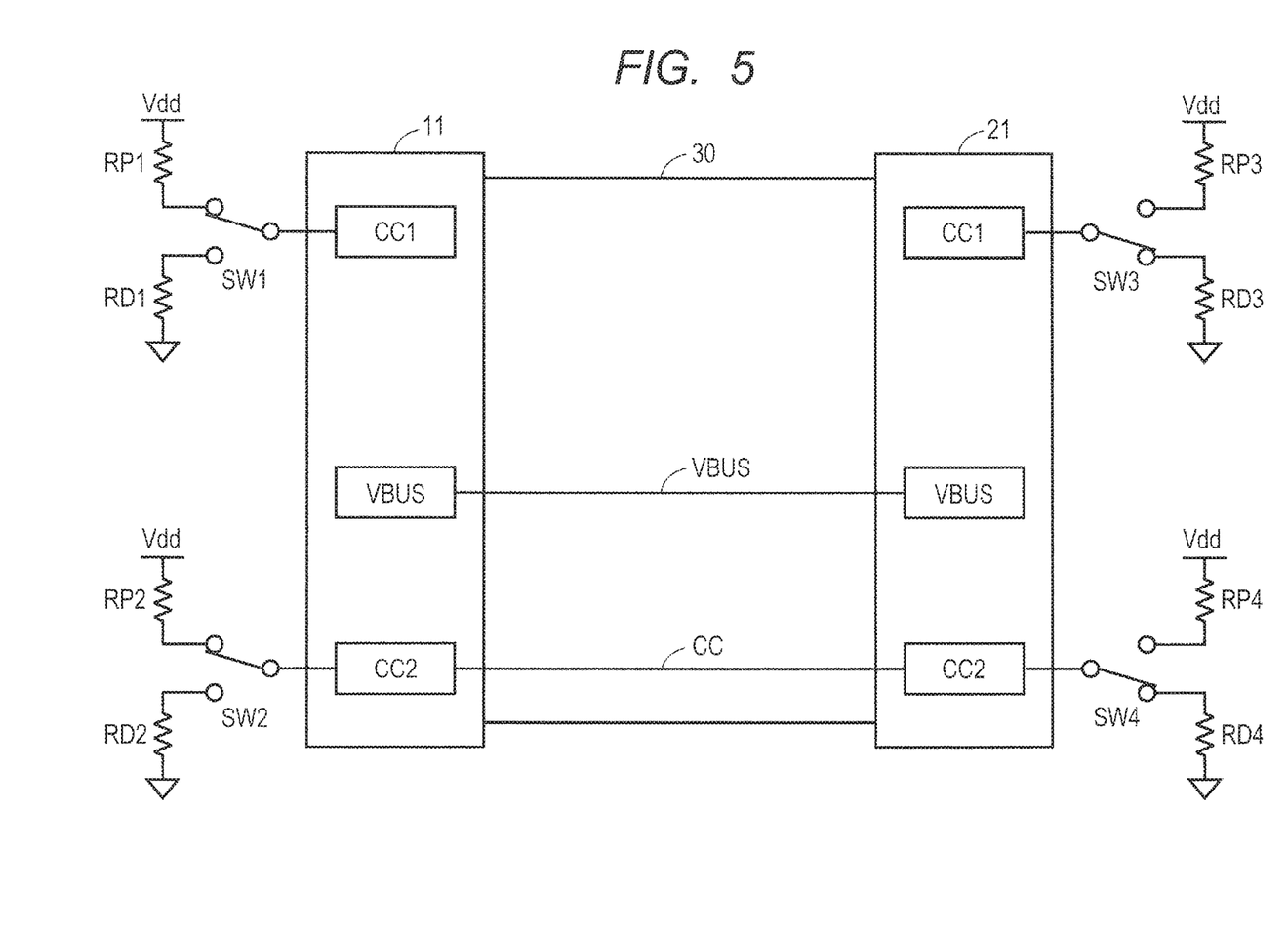
FIG. 5 is a diagram illustrating a coupling state (Part 2) of the battery device and the device through a cable.

FIG. 5 is a diagram illustrating a coupling state (Part 2) of the battery device 10 and the device 20 through the cable 30.

In the example illustrated in FIG. 5, the CC line of the cable 30 is coupled to the terminal CC2 of the connector 11 and the terminal CC2 of the connector 21. The terminal CC2 of the connector 11 is coupled to the pull-down resistor RD2, and the terminal CC2 of the connector 21 is coupled to the pull-down resistor RD4. At this time, the terminal CC2 of the connector 11 is at an intermediate potential. As a result, the controller 12 judges that the battery device 10 and the device 20 are coupled with each other.

Because the CC line of the cable 30 is coupled to the terminal CC2 of the connector 11, the role corresponding to the cable is a "source". The terminal CC2 of the connector 11 is coupled to the pull-up resistor RP2, the role corresponding to the switch is a "source". That is, at the coupling of the battery device 10 and the device 20, the role corresponding to the cable matches with the role corresponding to the switch.

In this case, the controller 12 performs a power supplying operation in accordance with the cable. The controller 12 outputs a control signal to the battery charger 14. In response to this control signal, the battery charger 14 converts an input voltage input from the battery 13 into a predetermined voltage, and outputs it to the device 20 through the terminal VBUS and the power source line VBUS.

(In a Case where the Role Corresponding to the Cable does not Match with the Role Corresponding to the Switch)

Figure 6:
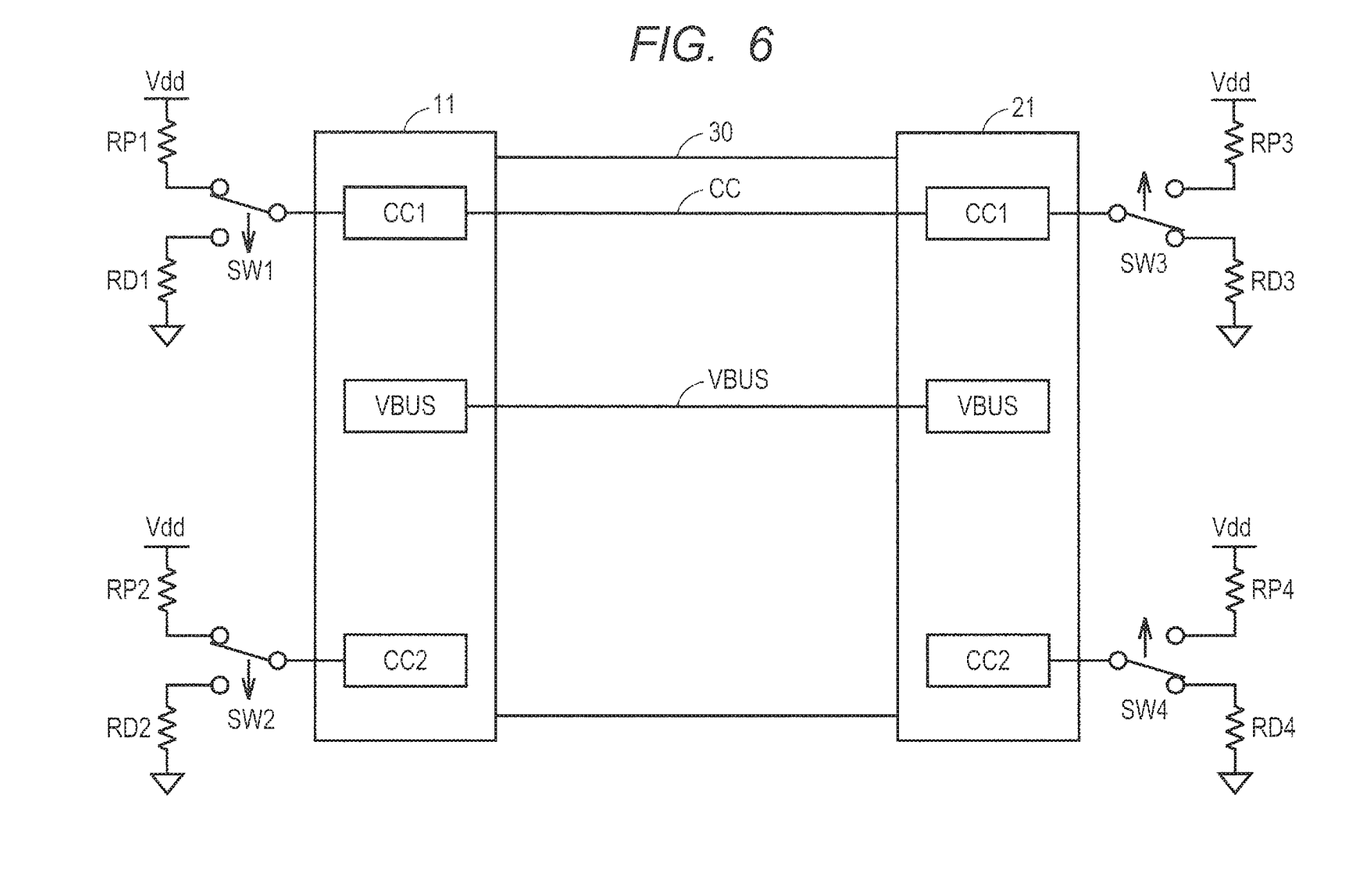
FIG. 6 is a diagram illustrating a coupling state (Part 3) of the battery device and the device through a cable.

FIG. 6 is a diagram illustrating a coupling state (Part 3) of the battery device 10 and the device 20 through the cable 30.

In the example illustrated in FIG. 6, the CC line of the cable 30 is coupled to the terminal CC1 of the connector 11 and the terminal CC1 of the connector 21. The terminal CC1 of the connector 11 is coupled to the pull-up resistor RP1, and the terminal CC1 of the connector 21 is coupled to the pull-down resistor RD3. At this time, the terminal CC1 of the connector 11 is at an intermediate potential. As a result, the controller 12 judges that the battery device 10 and the device 20 are coupled with each other.

Because the CC line of the cable 30 is coupled to the terminal CC1, the role corresponding to the cable is a "sink". Because the terminal CC1 of the connector 11 is coupled to the pull-up resistor RP1, the role corresponding to the switch is a "source". That is, at the coupling of the battery device 10 and the device 20, the role corresponding to the cable does not match with the role corresponding to the switch.

Figure 7:
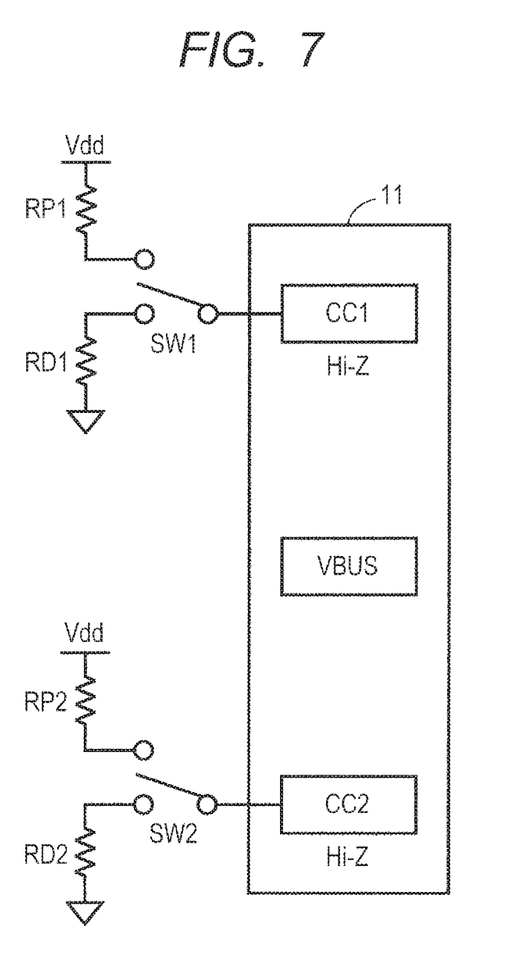
FIG. 7 is a diagram illustrating a switch in an open state.

In this case, the controller 12 controls the switches SW1 and SW2 to be in an open state where they are not coupled to any of the pull-up resistor and the pull-down resistor. FIG. 7 is a diagram illustrating the switches SW1 and SW2 in the open state.

For example, the switch SW1 includes a first FET (Field Effect Transistor) arranged between the terminal CC1 and the pull-up resist RP1 and a second FET arranged between the terminal CC1 and the pull-down resistor RD1. The controller 12 controls the first and second FETs to be in a non-conductive state, thereby realizing the open state of the switch SW1.

When the switches SW1 and SW2 are in the open state, the terminals CC1 and CC2 are in a high-impedance state. In this state, the controller 12 judges that the battery device 10 and the device 20 are not coupled with each other.

The controller 12 switches the coupling destination of the switch SW1 from the pull-up resistor RP1 to the pull-down resistor RD1, based on that the CC line is coupled to the terminal CC1. Because the switches SW1 and SW2 synchronize with each other, the controller 12 switches also the coupling destination of the switch SW2 from the pull-up resistor RP2 to the pull-down resistor RD2.

When the switches SW1 and SW2 are in the open state, the terminals CC1 and CC2 of the connector 21 are also in the high-impedance state. Thus, the device 20 also judges that coupling with the battery device 10 is interrupted. The controller 22 of the device 20 switches the coupling destination of the switches SW3 and SW4 from the pull-down resistors RD3 and RD4 to the pull-down resistors PR3 and PR4, when the CC line is coupled to the terminal CC1 of the connector 21.

The potential of the terminal CC1 of the connector 11 is at an intermediate potential in accordance with the operation of the above-described controllers 12 and 22. As a result, the controller judges that the battery device 10 and the device 20 are coupled with each other.

At this time, because the terminal CC1 of the connector 11 is coupled to the pull-down resistor RD1, the role corresponding to the switch is a "sink". That is, at the coupling of the battery device 10 and the device 20, the role corresponding to the cable matches with the role corresponding to the switch. As a result, the controller 12 performs a power receiving operation in accordance with the role corresponding to the cable.

Figure 8:
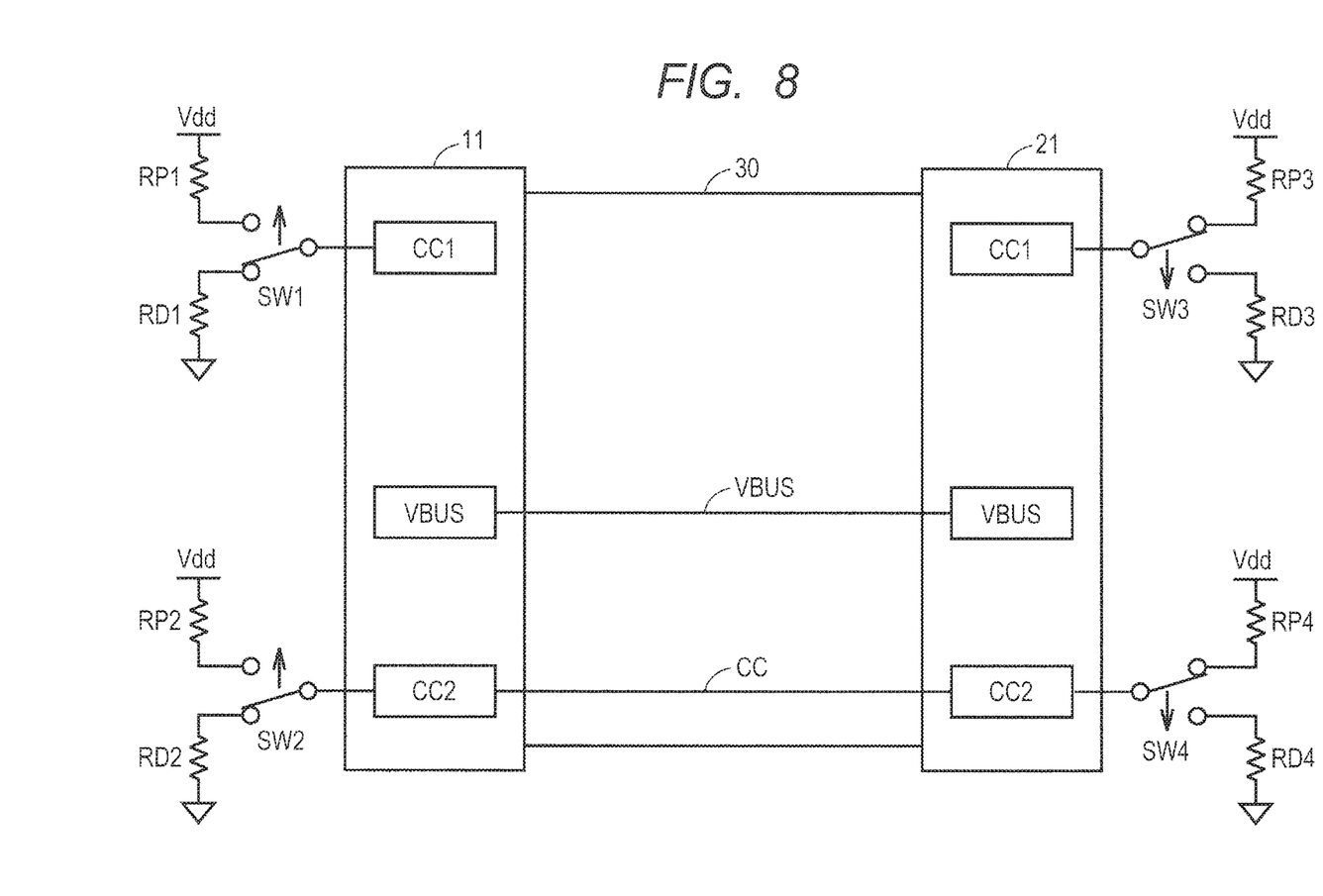
FIG. 8 is a diagram illustrating a coupling state (Part 4) of the battery device and the device through a cable.

FIG. 8 is a diagram illustrating a coupling state (Part 4) of the battery device 10 and the device 20 through the cable 30.

In the example illustrated in FIG. 8, the CC line of the cable 30 is coupled to the terminal CC2 of the connector 11 and the terminal CC2 of the connector 21. The terminal CC2 of the connector 11 is coupled to the pull-down resistor RD2, while the terminal CC2 of the connector 21 is coupled to the pull-up resistor RP4. At this time, the terminal CC2 of the connector 11 is at an intermediate potential. As a result, the controller 12 judges that the battery device 10 and the device 20 are coupled with each other.

Because the CC line of the cable 30 is coupled to the terminal CC2 of the connector 11, the role corresponding to the cable is a "source". Because the terminal CC2 of the connector 11 is coupled to the pull-down resistor RD2, the role corresponding to the switch is a "sink". That is, at the coupling of the battery device 10 and the device 20, the role corresponding to the cable does not match with the role corresponding to the switch.

In this case, as illustrated in FIG. 7, the controller 12 controls the switches SW1 and SW2 to be in an open state where they are not coupled to any of the pull-up resistors and the pull-down resistors. Then, the controller 12 once interrupts the coupling of the battery device 10 and the device 20.

The controller 12 changes the coupling destination of the switches SW1 and SW2 from the pull-down resistors RD1 and RD2 to the pull-up resistors RP1 and RP2, based on that the CC line is coupled to the terminal CC2.

When the switches SW1 and SW2 are in the open state, the controller 22 of the device 20 judges that the potential of the terminals CC1 and CC2 is a power source potential or a ground potential, and that the coupling with the battery device 10 is interrupted, in accordance with the state of the switches SW3 and SW4. Upon detection of interruption, the controller 22 performs an operation for switching the coupling destination of the switches SW3 and SW4 between the pull-up resistors RP3 and RP4 and the pull-down resistors RD3 and RD4.

By the operation of the above-described controllers 12 and 22, the potential of the terminal CC1 and the connector 11 is an intermediate potential. As a result, the controller 12 judges that the battery device 10 and the device 20 are coupled with each other.

At this time, the terminal CC2 of the connector 11 is coupled to the pull-up resistor RP2, the role corresponding to the switch is a "source". That is, at the coupling of the battery device 10 and the device 20, the role corresponding to the cable matches with the role corresponding to the switch. As a result, the controller 12 performs a power supply operation in accordance with the role corresponding to the cable.

(Control Structure)

Figure 9:
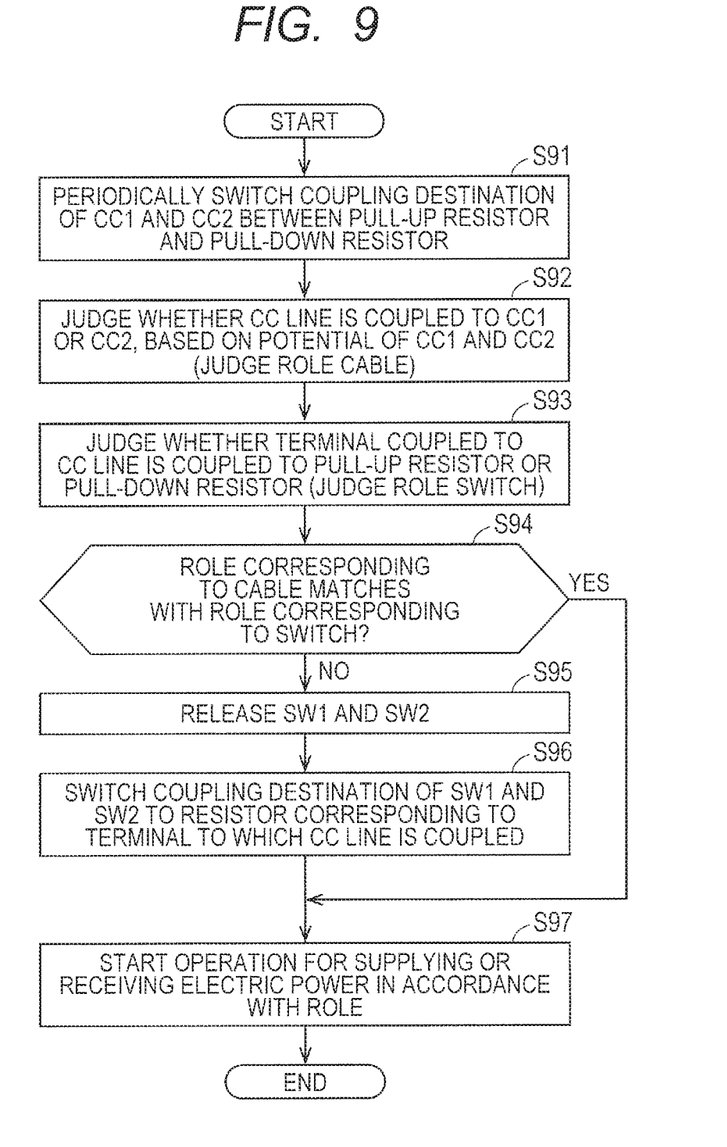
FIG. 9 is a flowchart illustrating a process to be executed by a controller controlling the battery device to function as a role corresponding to a cable.

FIG. 9 is a flowchart illustrating a process executed by the controller 12, for controlling the battery device 10 to function as a role corresponding to the cable. Each process illustrated in FIG. 9 may be realized by the controller 12 executing the program stored on a non-illustrative recording medium.

In Step S91, the controller 12 switches the coupling destination of the switches SW1 and SW2 between the pull-up resistors RP1 and RP2 and the pull-down resistors RD1 and RD2, at predetermined intervals.

In Step S92, the controller 12 judges that the battery device 10 and the device 20 are coupled with each other, based on that the potential of the terminal CC1 and the potential of the terminal CC2 are at the intermediate potential, based on an output of the A/D converters 15 and 16. As a result, the controller 12 stops the periodical switching operation of the switches SW1 and SW2. The controller 12 specifies a terminal which is coupled to the CC line of the cable 30, of the terminals CC1 and CC2, based on an output of the A/D converters 15 and 16. That is, the controller 12 judges the role (source/sink) of the battery device 10, corresponding to the cable.

In Step S93, the controller 12 judges whether the terminal (switch SW1 or SW2) coupled to the CC line is coupled to the pull-up resistor, or whether it is coupled to the pull-down resistor. That is, the controller 12 judges the role of the battery device 10 corresponding to the switch.

In Step S94, the controller 12 judges whether the role corresponding to the cable matches with the role corresponding to the switch. When it is judged that these roles match with each other (YES in Step S94), the controller 12 starts a power supply operation or a power receiving operation with the device 20, in accordance with the roles (Step S97).

When it is judged that the role corresponding to the cable does not match with the role corresponding to the switch (NO in Step S94), the controller 12 executes a procedure of Step S95.

In Step S95, the controller 12 opens the switches SW1 and SW2. As a result, the coupling between the battery device 10 and the device 20 is interrupted.

In Step S96, the controller 12 couples the switches SW1 and SW2 to the resistors corresponding to the terminals coupled to the CC line. When the CC line is coupled to the terminal CC1, the controller 12 couples the switches SW1 and SW2 respectively to the pull-down resistors RD1 and RD2. When the CC line is coupled to the terminal CC2, the controller 12 couples the switches SW1 and SW2 to the pull-up resistors RP1 and RP2.

In Step S97, the controller 12 starts a power supply operation or a power receiving operation with the device 20, in accordance with the role determined with the cable.

As described above, the battery device 10 according to the first embodiment can supply and receive electric power, using one connector 11. This battery device 10 does not need any addition switch for switching between the power supply operation and the power receiving operation. Thus, this battery device 10 can realize an easier structure than that of the battery device of the related art.

The user may couple the cable 30 to the connectors 11 and 21 in a state where its direction corresponds to a predetermined operation (power supply operation or power receiving operation). Thus, the battery device 10 according to the first embodiment is a more user-friendly device than the battery device of the related art.

Second Embodiment

The configuration of the power supply system according to the second embodiment is the same as that of the power supply system according to the first embodiment, and thus will not be described over and over.

The battery device 10 and the device 20 according to the second embodiment perform communication through the CC line of the cable 30, and start the power supply operation or the power receiving operation when an agreement is made therebetween. In one example, the battery device 10 and the device 20 are to perform communication with each other through the CC line in accordance with a protocol of USB Power Delivery (PD).

Figure 10:
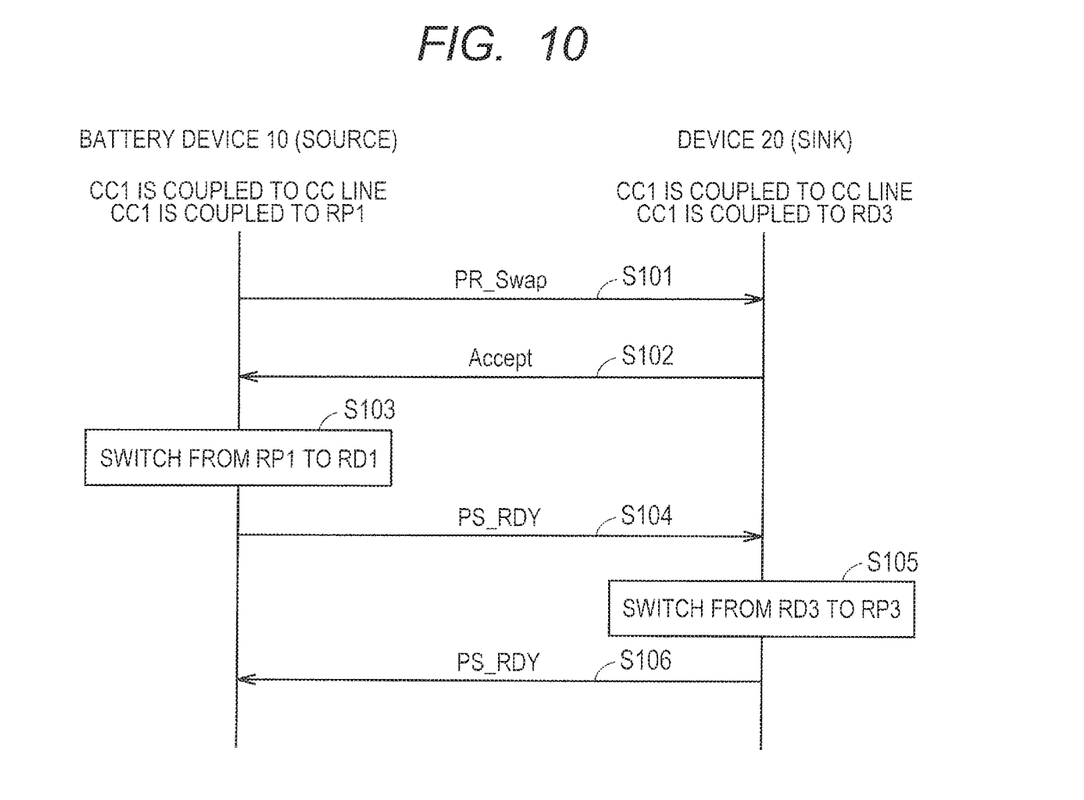
FIG. 10 is a flowchart illustrating a process of a power supply system according to a second embodiment.

FIG. 10 is a flowchart illustrating a process of the power supply system 100 according to the second embodiment. As preconditions of the flowchart illustrated in FIG. 10, the CC line is coupled to the terminal CC1 of the battery device 10, and the switch SW1 (terminal CC1) is coupled to the pull-up resistor RP1. That is, the role corresponding to the cable is a "sink", and the role corresponding to the switch is a "source". They do not match with each other.

The role at that moment of the battery device 10 corresponds to the role corresponding to the switch. That is, just before each process illustrated in FIG. 10 is executed, the battery device 10 functions as a "source".

In Step S101, the controller 12 of the battery device 10 as a source sends a PR_SWAP message to the device 20 as a sin through the CC line, in accordance with that the role corresponding to the cable does not match with the role corresponding to the switch. This message is to switch the role determined by the switch between the battery device 10 and the device 20. In the example of FIG. 10, this PR_SWAP message functions as a message for requesting the device 20 to change the role of the device 20 from the "sink" to the "source".

In Step S102, the controller 22 of the device 20 as a sink sends an Accept message representing that the request of the corresponding message is accepted, to the battery device 10, in response to reception of the PR_SWAP message.

In Step S103, the controller 12 switches the coupling destination of the switches SW1 and SW2 (terminal CC1 coupled to the CC line) respectively from the pull-up resistors RP1 and RP2 to the pull-down resistors RD1 and RD2, in response to reception of the Accept message from the device 20. As a result, in the battery device 10, the role (sink) corresponding to the cable matches with the role corresponding to the switch.

In Step S104, the controller 12 sends a PS_RDY message representing that it is ready to start an operation (a power receiving operation) in accordance with the role corresponding to the cable, to the device 20.

In Step S105, the controller 22 switches the coupling destination of the switches SW3 and SW4 (terminal CC1 coupled to the CC line) from the pull-down resistors RD3 and RD4 to the pull-up resistors RP3 and RP4, in response to reception of the PS_RDY message.

In Step S106, the controller 22 sends a PS_RDY message representing that it is ready to start an operation (power supply operation) in accordance with the role corresponding to the cable, to the battery device 10. As a result, the battery 23 supplies electric power to the battery 13.

As described above, the power supply system 100 according to the second embodiment can perform a power receiving operation or a power supply operation, after an agreement is made through communication between the battery device 10 and the device 20.

When the PR_SWAP message is received in a state where the role corresponding to the cable matches with the role corresponding to the switch, the device 20 which function also as a battery device returns a Reject message representing that the request of this message is rejected, to the battery device 10.

When a PR_SWAP message requesting a change from the sink to the source is received in a state where the residual capacity of the battery 23 is less than a predetermined value, the device 20 may return a Reject message representing that the request of the message is rejected to the battery device 10.

[Configuration]

The above-disclosed technical features will hereinafter be summarized.

(Configuration 1)

According to one embodiment, there is provided the battery device 10 which can be coupled to the device 20 through the cable 30. This battery device 10 includes the connector 11 coupleable with the cable 30, the battery 13, and the controller 12 for switching whether the battery device 10 functions as a source or a sink. The connector 11 includes the terminal CC1 coupleable to the device 20 through the front surface of the cable 30 (CC line) and the terminal CC2 coupleable to the device 20 through the back surface of the cable 30. The controller 12 charges the battery 13 with electric power from the device 20, when the terminal CC1 and the device 20 are coupled with each other through the front surface of the cable 30, in a state where it is set as a sink. The controller 12 is configured to supply electric power from the battery 13 to the device 20, when the terminal CC2 and the device 20 are coupled with each other through the back surface of the cable 30, in a state where it is set as a source.

(Configuration 2)

The terminal CC1 and the terminal CC2 are configured to be coupled to the different pull-up resistors RP1 and RP2 or the different pull-down resistors RD1 and RD2. The controller 12 switches the coupling destination of the terminals CC1 and the terminal CC2 between the pull-up resistors and the pull-down resistors, in a state where the battery device 10 and the device 20 are not coupled with each other. The controller 12 charges the battery with electric power from the device 20, when the terminal CC1 is coupled to the pull-down resistor RD1 corresponding to a power receiving mode, of the pull-up resistor RP1 and the pull-down resistor RD1, in a state where the terminal CC1 and the device 20 are coupled with each other through the front surface of the cable 30. The controller 12 is configured to supply electric power from the battery 13 to the device 20, when the terminal CC2 is coupled to the pull-up resistor RP2 corresponding to a power supply mode, of the pull-up resistor RP2 and the pull-down resistor RD2, in a state where the terminal CC2 and the device 20 are coupled with each other through the back surface of the cable 30.

(Configuration 3)

The controller 12 switches from the resistor coupled to the terminal CC1 to the pull-down resistor RD1 corresponding to the power receiving mode, when the terminal CC1 is coupled to the pull-up resistor RP1 corresponding to the power supply mode, in a state where the terminal CC1 and the device 20 are coupled with each other through the front surface of the cable 30. The controller 12 switches from the resistor coupled to the terminal CC2 to the pull-up resistor RP2 corresponding to the power supply mode, when the terminal CC2 is coupled to the pull-down resistor RD2 corresponding to the power receiving mode, in a state where the terminal CC2 and the device 20 are coupled with each other through the back surface of the cable 30.

(Configuration 4)

The controller 12 switches from the resistor coupled to the terminal CC1 to the pull-down resistor RD1 corresponding to the power receiving mode, in a state where the terminal CC1 and the device 20 are coupled with each other through the front surface of the cable 30, when the terminal CC1 is coupled to the pull-up resistor RP1 corresponding to the power supply mode, after opening the switch SW1 to control the terminal CC1 to be in a high-impedance state. The controller 12 switches from the resistor coupled to the terminal CC2 to the pull-up resistor RP2 corresponding to the power supply mode, in a state where the terminal CC2 and the device 20 are coupled with each other through the back surface of the cable 30, when the terminal CC2 is coupled to the pull-down resistor RD2 corresponding to the power receiving mode, after opening the switch SW2 to control the terminal CC2 to be in a high-impedance state.
(Configuration 5)

The device 20 is configured to switch the source supplying the battery 10 with electric power through the cable 30 and the sink accepting an input of electric power from the battery device 10 through the cable 30. The controller 12 is configured to perform bi-directional communication with the device 20 through the cable 30. In a state where the terminal CC1 and the device 20 are coupled with each other through the front surface of the cable 30, when the terminal CC1 is coupled to the pull-up resistor RP1 corresponding to the power supply mode, the controller 12 sends a RP SWAP message as a request for switching between the source and the sink to the device 20, and switches from the resistor coupled to the terminal CC1 to the pull-down resistor RD1 corresponding to the power receiving mode, in response to reception of the Accept message representing that the request is accepted from the device 20.
(Configuration 6)

The device 20 is configured to switch between the source for supplying electric power to the battery device 10 through the cable 30 and the sink for accepting the input of electric power from the battery device 10 through the cable 30. The controller 12 is configured to perform bi-directional communication with the device 20 through the cable 30. In a state where the terminal CC2 and the device 20 are coupled with each other through the back surface of the cable 30, when the terminal CC2 is coupled to the pull-down resistor RD2 corresponding to the power receiving mode, the controller 12 sends the PR_SWAP message as a request for switching between the source and the sink to the device 20, and switches from the resistor coupled to the terminal CC2 to the pull-up resistor RP2 corresponding to the power supply mode, in response to reception of the Accept message representing that the request is accepted from the device 20.
(Configuration 7)

According to another aspect, there is provided a program to be executed by the controller 12 of the battery device 10 which is coupleable to the device 20 through the cable 30. The connector 11 to be coupled to the cable 30 provided in the battery device 10 includes the terminal CC1 and the terminal CC2. The CC1 is coupleable to the device 20 through the front surface of the cable 30, while the terminal CC2 is coupleable to the device 20 through the back surface of the cable 30. The program makes a computer to execute the steps of: switching a coupling destination of the terminal CC1 and the terminal CC2 between the different pull-up resistors RP1 and RP2 and the different pull-down resistors RD1 and RD2, in a state where the battery device 10 and the device 20 are not coupled with each other (Step S91); judging whether any of the terminal CC1 and the terminal CC2 is coupled to the device 20 through the cable 30, when the battery device 10 and the device 20 are coupled with each other (Step S92); judging whether the coupling destination of the terminal CC1 and the terminal CC2 is any of the pull-up resistors RP1 and RP2 and the pull-down resistors RD1 and RD2, when the battery device 10 and the device 20 are coupled with each other (Step S93); judging whether a predetermined condition regarding the judged terminal and the judged resistor is satisfied (Step S94); and switching the coupling destination of the terminal CC1 and the terminal CC2 from the judged resistor, when it is judged that the condition is not satisfied (No in Step S94) (Step S96).

The inventions by the present inventors have specifically been described based on the preferred embodiments. The present invention is not limited to the preferred embodiments, and various changes may be made without departing from the scope thereof.

What is claimed is:

1. A battery device coupleable to an opposed unit through a cable, comprising:
    a connector which is coupleable to the cable;
    a battery; and
    a control device which switches between a power supply mode for supplying electric power from the battery to the opposed unit through the cable and a power receiving mode for charging the battery with electric power from the opposed unit through the cable,
    wherein the connector includes
        a first terminal coupleable to the opposed unit through a cable in a first state, and
        a second terminal coupleable to the opposed unit through a cable in a second state which is inverted upside down from the first state,
    wherein the control device is configured to
        charge the battery with electric power from the opposed unit, in a state where the power receiving mode is set, and when the first terminal and the opposed unit are coupled with each other through the cable in the first state, and
        supply the opposed unit with electric power from the battery, in a state where the power supply mode is set, when the second terminal and the opposed unit are coupled with each other through the cable in the second state, and
    wherein the first terminal and the second terminal are configured to be coupled to different pull-up resistors or pull-down resistors.

2. The battery device according to claim 1,
    wherein the control device is configured to
        switch a coupling destination of the first terminal and the second terminal between a pull-up resistor and a pull-down resistor, in a state where the battery device is not coupled to the opposed unit,
        charge the battery with electric power from the opposed unit, in a state where the first terminal and the opposed unit are coupled with each other through the cable in the first state, when the first terminal is coupled to a resistor corresponding to the power receiving mode, of the pull-up resistor and the pull-down resistor, and
        supply the battery with electric power from the battery, in a state where the second terminal and the opposed unit are coupled with each other through the cable in the second state, when the second terminal is coupled to a resistor corresponding to the power supply mode, of the pull-up resistor and the pull-down resistor.

3. The battery device according to claim 2,
    wherein the control device is configured to
        switch a resistor coupled to the first terminal to the resistor corresponding to the power receiving mode, in a state where the first terminal and the opposed unit are coupled with each other through the cable in the first state, when the first terminal is coupled to the resistor corresponding to the power supply mode, and
        switch a resistor coupled to the second terminal to the resistor corresponding to the power supply mode, in a state where the second terminal and the opposed unit are coupled with each other through the cable in the second state, when the second terminal is coupled to the resistor corresponding to the power receiving mode.

4. The battery device according to claim 3, wherein the control device is configured to
switch the resistor coupled to the first terminal to the resistor corresponding to the power receiving mode after controlling the first terminal to be in a high-impedance state, in a state where the first terminal and the opposed unit are coupled with each other through the cable in the first state, when the first terminal is coupled to the resistor corresponding to the power supply mode, and
switch the resistor coupled to the second terminal to the resistor corresponding to the power supply mode after controlling the second terminal to be in a high-impedance state, in a state where the second terminal and the opposed unit are coupled with each other through the cable in the second state, when the second terminal is coupled to the resistor corresponding to the power receiving mode.

5. The battery device according to claim 2, wherein the opposed unit is configured to switch between a first mode for supplying the battery device with electric power through the cable and a second mode for accepting an input of electric power from the battery device through the cable, and
wherein the control device
is configured to perform bi-directional communication with the opposed unit through the cable,
sends a request for switching between the first mode and the second mode to the opposed unit, in a state where the first terminal and the opposed unit are coupled with each other through the cable in the first state, when the first terminal is coupled to the resistor corresponding to the power supply mode, and
switches the resistor coupled to the first terminal to the resistor corresponding to the power receiving mode, in response to reception of a signal representing that the request is accepted from the opposed unit.

6. The battery device according to claim 2, wherein the opposed unit is configured to switch between a first mode for supplying the battery device with electric power through the cable and a second mode for accepting an input of electric power from the battery device through the cable, and
wherein the control device
is configured to perform bi-directional communication with the opposed unit through the cable,
sends a request for switching between the first mode and the second mode to the opposed unit, in a state where the second terminal and the opposed unit are coupled with each other through the cable in the second state, when the second terminal is coupled to the resistor corresponding to the power supplying mode, and
switches the resistor coupled to the second terminal to the resistor corresponding to the power supply mode, in response to reception of a signal representing that the request is accepted from the opposed unit.

7. A program executed by a computer of a battery device coupleable to an opposed unit through a cable,
wherein a connector to be coupled to the cable provided in the battery device includes
a first terminal coupleable to the opposed unit through the cable in a first state, and
a second terminal coupleable to the opposed unit through the cable in a second state which is inverted upside down from the first state, and
wherein the program causes a computer to execute the steps of:
switching a coupling destination of the first terminal and the second terminal between different pull-up resistors and different pull-down resistors, in a state where the battery device and the opposed unit are not coupled with each other,
judging whether any of the first terminal and the second terminal is coupled to the opposed unit through the cable, when the battery device and the opposed unit are coupled with each other,
judging whether a coupling destination of the first terminal and the second terminal is any of the pull-up resistors and the pull-down resistors, when the battery device and the opposed unit are coupled with each other,
judging whether a predetermined condition regarding the judged terminal and the judged resistor is satisfied, and
switching a coupling destination of the first terminal and the second terminal from the judged resistor, when it is judged that the condition is not satisfied.

* * * * *